US008882464B2

(12) United States Patent
Smith et al.

(10) Patent No.: US 8,882,464 B2
(45) Date of Patent: Nov. 11, 2014

(54) AIRCRAFT PROPELLERS

(75) Inventors: Blair A. Smith, South Windsor, CT (US); David J. Grulke, Tolland, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 487 days.

(21) Appl. No.: 13/208,897

(22) Filed: Aug. 12, 2011

(65) Prior Publication Data
US 2013/0039765 A1 Feb. 14, 2013

(51) Int. Cl.
*B64C 11/20* (2006.01)
*B64C 11/00* (2006.01)
*B64C 11/04* (2006.01)

(52) U.S. Cl.
CPC ............. *B64C 11/008* (2013.01); *B64C 11/04* (2013.01)
USPC ........................................................ 416/145

(58) Field of Classification Search
USPC .............................. 416/144, 145, 500; 244/65
See application file for complete search history.

(56) References Cited

U.S. PATENT DOCUMENTS

| 1,805,149 | A |   | 5/1931  | Nelson |          |
|-----------|---|---|---------|--------|----------|
| 2,085,769 | A | * | 7/1937  | Scott  | 416/145  |
| 2,186,199 | A |   | 1/1940  | Martin |          |
| 2,317,629 | A |   | 4/1943  | McCauley |        |
| 2,339,624 | A |   | 1/1944  | Davis  |          |
| 2,362,842 | A |   | 11/1944 | Mueller |         |
| 2,444,196 | A |   | 6/1948  | Hackethal et al. |  |
| 2,465,007 | A | * | 3/1949  | Bragdon et al. | 416/144 |
| 2,494,765 | A | * | 1/1950  | Kienast | 430/19  |
| 2,715,446 | A | * | 8/1955  | Felt | 416/145 |
| 2,754,917 | A | * | 7/1956  | Kee | 416/144 |
| 3,323,597 | A | * | 6/1967  | Lougobardi et al. | 416/144 |
| 3,402,772 | A | * | 9/1968  | Sobanik | 416/144 |
| 3,586,460 | A | * | 6/1971  | Toner | 416/144 |
| 4,076,453 | A | * | 2/1978  | Feroy | 416/174 |
| 4,513,619 | A |   | 4/1985  | Widdall |  |
| 4,524,499 | A | * | 6/1985  | Grimes et al. | 29/889.61 |
| 4,784,575 | A | * | 11/1988 | Nelson et al. | 416/226 |
| 4,969,367 | A |   | 11/1990 | Huber et al. |  |
| 5,791,595 | A |   | 8/1998  | Jamieson |  |
| 6,422,816 | B1 |  | 7/2002  | Danielson |  |
| 7,422,419 | B2 |  | 9/2008  | Carvalho |  |
| 2006/0104818 | A1 | * | 5/2006 | McMillan et al. | 416/232 |
| 2007/0212221 | A1 |   | 9/2007 | Carvalho et al. |  |
| 2009/0306829 | A1 |   | 12/2009 | Hildebrand et al. |  |
| 2010/0104443 | A1 | * | 4/2010 | Pentony | 416/219 A |
| 2010/0310368 | A1 |   | 12/2010 | Perkinson et al. |  |

FOREIGN PATENT DOCUMENTS

GB      347964 A  *  5/1931
GB      599368 A      4/1946

OTHER PUBLICATIONS

Extended European Search Report for European Application No. 12180130.2-1754 / 2557032 dated Sep. 20, 2013, 6 pages.

* cited by examiner

*Primary Examiner* — Liam McDowell
(74) *Attorney, Agent, or Firm* — Canton Colburn LLP

(57) ABSTRACT

An aircraft propeller taper bore insert apparatus includes a tapered outer surface, the outer surface dimensioned and configured to fit within and be of substantially a same size and shape as an aircraft propeller taper bore or an aircraft propeller balancing tube, and an inner surface, the inner surface defining an inner cavity configured to receive a balancing medium, the inner surface comprising a plurality of retention formations arranged thereon, and the plurality of retention formations being configured to support the balancing medium.

12 Claims, 5 Drawing Sheets

AIRCRAFT PROPELLERS

BACKGROUND OF THE INVENTION

This invention is generally related to propeller systems, and more particularly, example embodiments of the present invention are related to systems for balancing aircraft propellers.

Propeller systems typically include a hub to which two or more propeller blades are coupled. Rotation of the hub causes the blades to rotate. In order for the rotation to be smooth the blades are typically balanced.

BRIEF DESCRIPTION OF THE INVENTION

According to an example embodiment of the present invention, an aircraft propeller taper bore insert apparatus includes an outer surface and an inner surface. The outer surface is dimensioned and configured to fit within an aircraft propeller taper bore or an aircraft propeller balancing tube, the inner surface defines an inner cavity configured to receive a balancing medium, the inner surface comprises a plurality of retention formations arranged thereon, and the plurality of retention formations are configured to support the balancing medium.

According to another example embodiment of the present invention, a propeller blade includes a propeller body defining a taper bore cavity, a balancing tube arranged within the taper bore cavity, and a taper bore insert. The taper bore insert includes an outer surface and an inner surface. The outer surface is dimensioned and configured to fit within the balancing tube, the inner surface defines an inner cavity configured to receive a balancing medium, the inner surface comprises a plurality of retention formations arranged thereon, and the plurality of retention formations are configured to support the balancing medium.

According to yet another example embodiment of the present invention, an aircraft propeller system includes a propeller hub, a first aircraft propeller blade arranged on the propeller hub, and a second aircraft propeller blade arranged on the propeller hub opposing the first aircraft propeller blade. The first aircraft propeller blade and the second aircraft propeller blade each include a propeller body defining a taper bore cavity, a balancing tube arranged within the taper bore cavity, and a taper bore insert. Each taper bore insert includes an outer surface and an inner surface. Each outer surface is dimensioned and configured to fit within the balancing tube, the inner surface defines an inner cavity configured to receive a balancing medium, the inner surface comprises a plurality of retention formations arranged thereon, and the plurality of retention formations are configured to support the balancing medium.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Conventionally, to achieve proper balance moments in propellers used in aircraft, lead wool is positioned within a hollow core of a taper bore portion of propellers. It should be appreciated that lead is generally considered environmentally unfriendly and thus aircraft propeller systems using lead wool may prove difficult to properly service and/or dispose of.

Example embodiments of the present invention provide novel aircraft propeller taper bore balancing systems which can negate or reduce the need for lead wool to achieve proper balance of the blades. A technical effect of one embodiment includes the use a variety of different materials according to a particular availability of material without resorting to the use of environmentally unfriendly materials to balance a propeller system.

Figure 1:
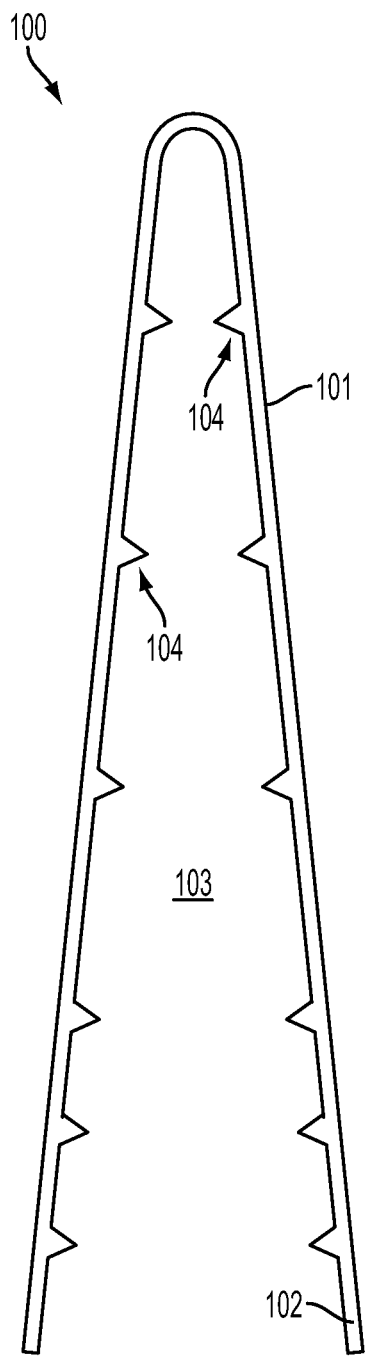
FIG. 1 is a diagram of an aircraft propeller taper bore insert, according to an example embodiment.

Turning to FIG. 1, an aircraft propeller taper bore insert is illustrated. The taper bore may be an interior portion of an aircraft propeller's blade. As illustrated, the taper bore insert 100 includes an outer surface 101 and an inner surface 102. As illustrated, the outer surface 101 may be shaped and dimensioned to be of substantially the same size and shape as a conventional propeller taper bore. That is, the taper bore insert 100 can be configured such that it may be positioned within a taper bore within a propeller blade. The inner surface 102 defines an inner cavity 103. Furthermore, the inner surface 102 may include a plurality of retention formations 104 arranged thereon.

As shown, the retention formations 104 may protrude inwardly from the inner surface 102 into the inner cavity 103. The retention formations 104 may extend along the entire inner surface 102 forming "ribs," or may be segmented or finger-like protrusions. Alternatively, the retention formations 104 may be grooves or groove-like indentation formations formed in the inner surface 102. Also, the retention formations 104 may include discontinuous indentations (e.g., dimple-like features) comparable to the discontinuous protrusions noted above, or complimentary to the linear features noted for both protrusions and indentations (i.e., ribs and grooves).

According to example embodiments, the retention formations 104 provide a mechanical support arrangement for allowing adhesion of a filler material thereto such that a balancing medium may be dispersed and supported within the inner cavity 103. For example, such is illustrated in FIG. 2.

Figure 2:
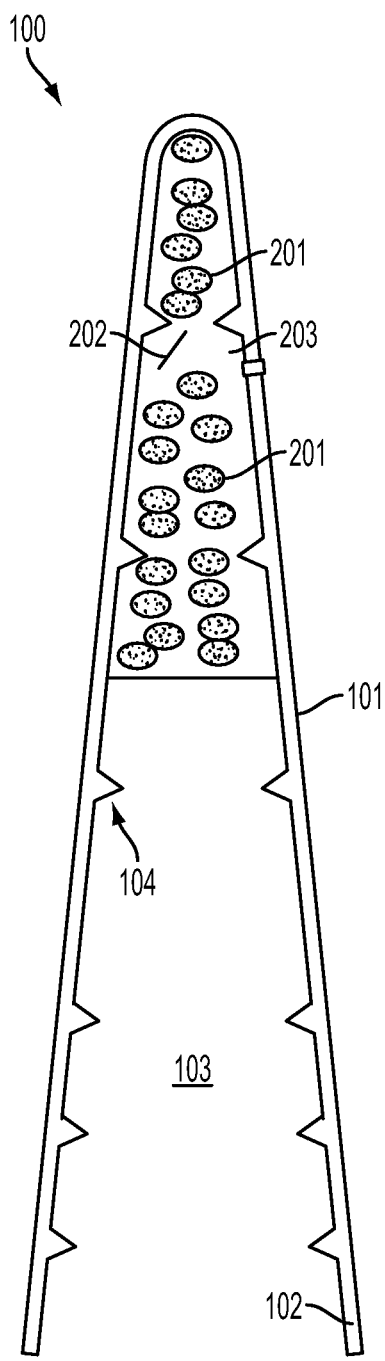
FIG. 2 is a diagram of an aircraft propeller taper bore insert that includes a balancing medium disposed therein, according to an example embodiment.

As illustrated in FIG. 2, balancing medium 202 comprises a plurality of particles 201. For example, particles 201 may be formed of any suitable material allowing for proper balancing of an aircraft propeller, for example, steel shot, copper shot, steel pellets, copper pellets, sand, ceramic pellets, rocks, or any other suitable material. Each particle may be of relatively the same size or may be of different sizes.

The balancing medium 202 further comprises a filler material 203 filling the expanses between particles. The filler material 203 may be a binder or matrix allowing for adhesion to the discreet particles 201 and inner cavity of the taper bore insert, or simply a mechanical interference fit between the balancing medium and the taper bore insert, and may include an adhesive, thermoplastic, elastomer, thermoset polymeric resin, gel, sealant, wax or any other suitable material configured to restrict movement of the particles 201 within the inner cavity 103. Although not particularly illustrated, it should be understood that the taper bore insert 100 may be sealed or unsealed depending upon any desired implementation. For example, a sealing plug, cap, or insert may be arranged to compress and seal the balancing medium 202. Further, a sealing plug or plug-like member, cap, threaded sealing member, or insert may be positioned to seal the entire inner cavity 103.

Therefore, according to example embodiments, an aircraft propeller taper bore insert may be filled with a balancing medium 202 to achieve a proper balance moment of an aircraft propeller. Hereinafter, additional example embodiments more clearly illustrating installation of taper bore inserts within aircraft propellers are provided with reference to FIGS. 3-5.

Figure 3:
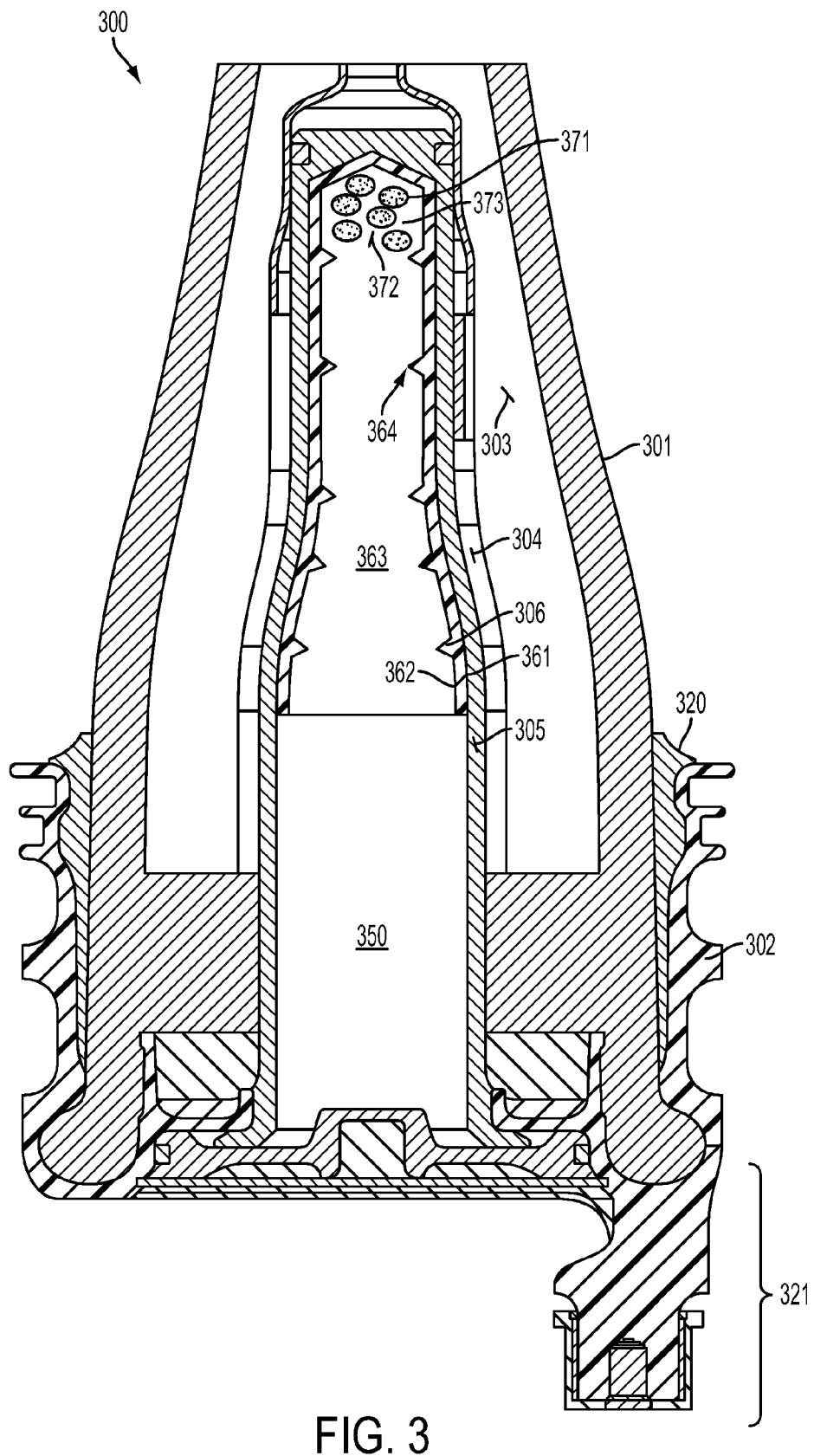
FIG. 3 is a diagram of an aircraft propeller blade, according to an example embodiment.

Turning to FIG. 3, a portion of an aircraft propeller blade is illustrated. The aircraft propeller blade 300 includes a propeller body 301 and a support body 302. The propeller blade 300 further includes a support medium 320 (e.g., cushion or foam) arranged within the support body 302 proximate the propeller body 301. The support body 302 includes pitch control formation 321 disposed to allow modification of a pitch of the propeller body 301.

As further illustrated, the propeller body 301 includes a taper bore surface 304 defined in a cavity 303. The cavity 303 may be filled with a cushioning material or may be relatively empty. Furthermore, the cavity 303 may be solid, for example, formed of any suitable lightweight composite material, or metals such as aluminum, titanium, or any suitable metal alloy. The taper bore surface 304 further defines an internal taper bore cavity including balancing tube 305 arranged therein. The balancing tube 305 may be formed of any suitable material, including lightweight composite materials and/or metals such as aluminum, titanium, or any suitable metal alloy. The balancing tube 305 defines cavity 350 configured to receive a taper bore insert.

As further illustrated, the propeller blade 300 includes the taper bore insert 306 arranged within the cavity 350. The taper bore insert 306 includes an outer surface 361 and an inner surface 362. As illustrated, the outer surface 361 may be shaped and dimensioned to be of substantially the same size and shape the cavity 350. The inner surface 362 may define inner cavity 363. Furthermore, the inner surface 362 may include a plurality of retention formations 364 arranged thereon.

As shown, the retention formations 364 may protrude within the inner cavity 363. The retention formations 364 may extend along the entire inner surface 362 forming "ribs," or may be segmented or finger-like protrusions. Alternatively, the retention formations 364 may be grooves or groove-like indentation formations formed in the inner surface 362. Also, the retention formations 364 may include discontinuous indentations (e.g., dimple-like features) comparable to the discontinuous protrusions noted above, or complimentary to the linear features noted for both protrusions and indentations (i.e., ribs and grooves).

According to example embodiments, the retention formations 364 provide a mechanical support arrangement for allowing adhesion and support of balancing medium 372 comprising filler material 373 and particles 371 therein. The balancing medium 372 may be substantially similar to the balancing medium 202 described above.

Thus, as described above, example embodiments provide aircraft propellers comprising a propeller body, a support body, and a taper bore cavity disposed within the propeller body. The taper bore cavity may include a balancing tube arranged therein. Further, the balancing tube may define a cavity configured to receive a taper bore insert. The taper bore insert may be substantially similar to the insert 100 illustrated in FIGS. 1-2 and the insert 306 of FIG. 3. However, according to some example embodiments, a taper bore insert may be omitted, and a balancing tube may be formed and configured to retain a balancing medium therein.

Figure 4:
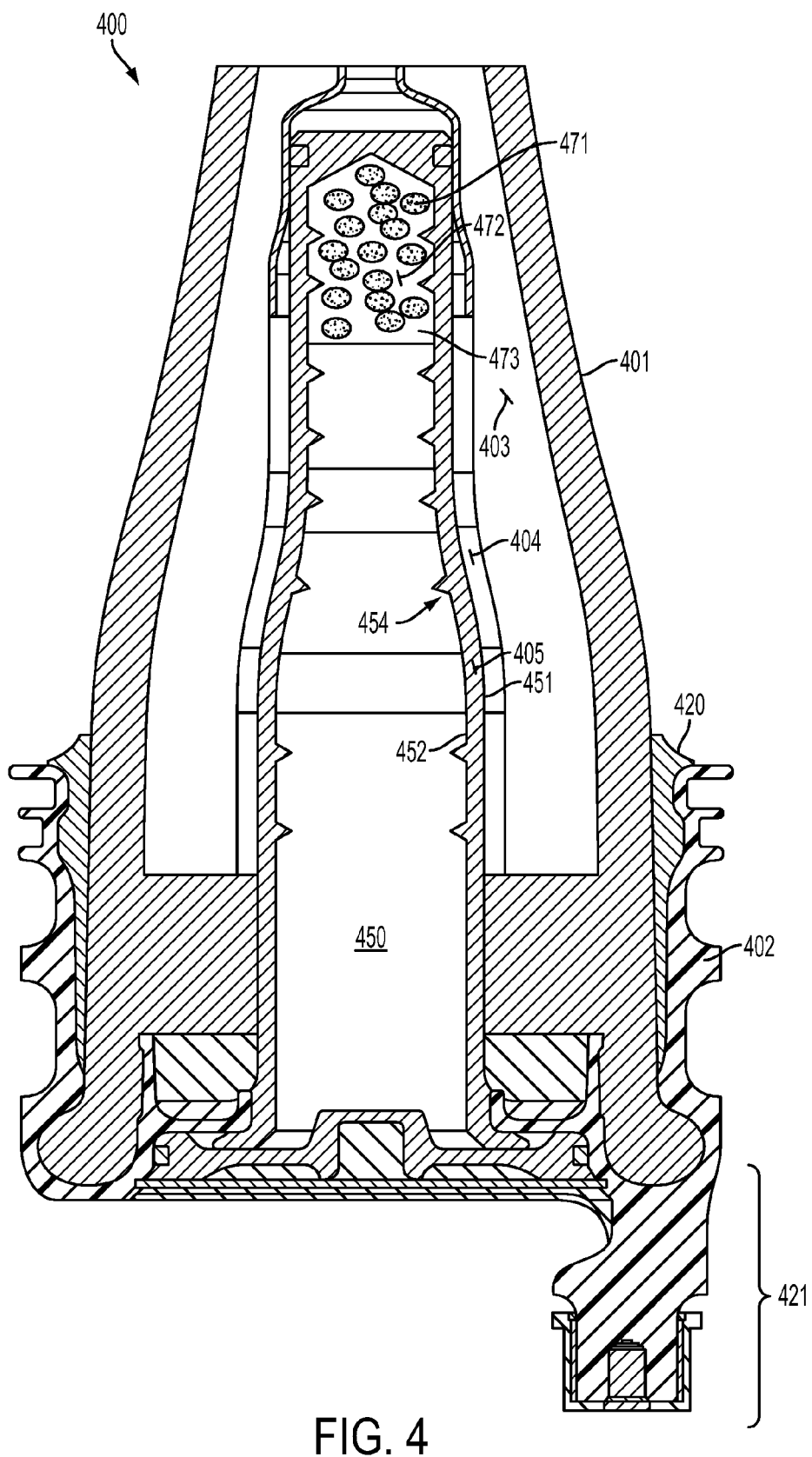
FIG. 4 is a diagram of an aircraft propeller blade, according to another example embodiment.

For example, turning to FIG. 4, a portion of an aircraft propeller blade is illustrated. The aircraft propeller blade 400 includes a propeller body 401 and a support body 402. The propeller blade 400 further includes a support medium 420 (e.g., cushion or foam) arranged within the support body 402 proximate the propeller body 401. The support body 402 includes pitch control formation 421 disposed to allow modification of a pitch of the propeller body 401.

As further illustrated, the propeller body 401 includes a taper bore surface 404 defined in cavity 403. The cavity 403 may be filled with a cushioning material or may be relatively empty. The taper bore surface 404 further defines an internal taper bore cavity including balancing tube 405 arranged therein. The balancing tube 405 may be formed of any suitable material, including lightweight composite materials and/or metals such as aluminum, titanium, or any suitable metal alloy.

As further illustrated, the balancing tube includes an outer surface 451 and an inner surface 452. As illustrated, the outer surface 451 may be shaped and dimensioned to be of substantially the same size and shape the inner cavity 450. The inner surface 452 may define inner cavity 450. Furthermore, the inner surface 452 may include a plurality of retention formations 454 arranged thereon.

As shown, the retention formations 454 may protrude within the inner cavity 450. The retention formations 454 may extend along the entire inner surface 452 forming "ribs," or may be segmented or finger-like protrusions. Alternatively, the retention formations 454 may be grooves or groove-like indentation formations formed into the inner surface 452. Also, the retention formations 454 may include discontinuous indentations (e.g., dimple-like features) comparable to the discontinuous protrusions noted above, or complimentary to the linear features noted for both protrusions and indentations (i.e., ribs and grooves).

According to example embodiments, the retention formations 454 provide a mechanical support arrangement for allowing adhesion and support of balancing medium 472 comprising filler material 473 and particles 471 therein. The balancing medium 472 may be substantially similar to the balancing medium 202 and 372 described above.

Thus, as described above, example embodiments provide aircraft propellers comprising a propeller body, a support body, and a taper bore cavity disposed within the propeller body. The taper bore cavity may include a balancing tube arranged therein. Further, the balancing tube may include an inner surface having a plurality of retention formations arranged thereon configured to support a balancing medium within the balancing tube. Thus, proper balance moment of a propeller may be achieved.

Figure 5:
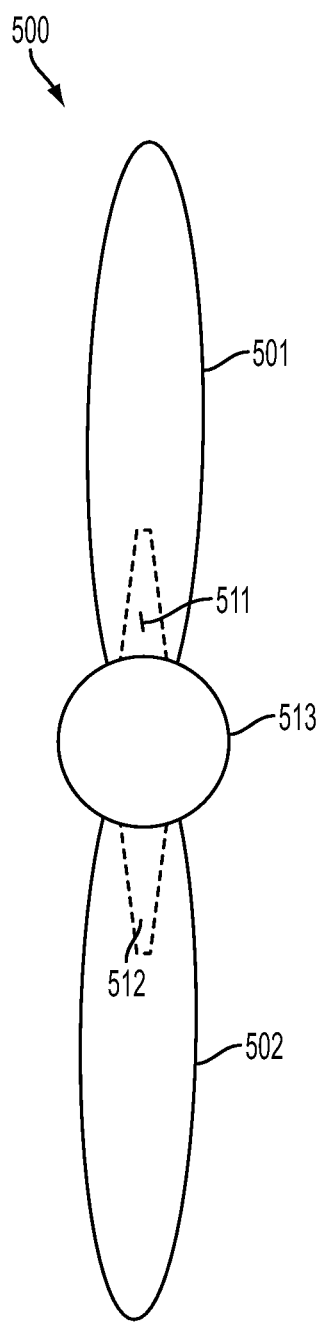
FIG. 5 is a diagram of an aircraft propeller system, according to an example embodiment.

Turning now to FIG. 5, an aircraft propeller system is illustrated. As shown, the system 500 includes a first propeller blade 501 and a second propeller blade 502 supported by propeller hub 513. The first propeller blade 501 and the second propeller 502 may be substantially similar to propeller blades 300 or 400. For example, the first propeller blade 501 may include a taper bore cavity 511 defined therein, and configured to receive the balancing tube 305 and taper bore insert 306; or alternatively, the balancing tube 405. Furthermore, the second propeller blade 502 may include a taper bore cavity 512 defined therein, and configured to receive the balancing tube 305 and taper bore insert 306; or alternatively, the balancing tube 405. Thus, the system 500 may be balanced using any of the balancing mediums described herein, and may therefore avoid the use of lead wood as in conventional systems.

Alternatively, the first propeller blade 501 and the second propeller blade 502 may include any conventional propeller including a taper bore insert cavity or any suitable cavity configured to receive the taper bore insert 100.

Furthermore, although particularly illustrated as including two propeller blades, it should be readily understood that example embodiments may include propeller systems with any desired number of propeller blades.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade, comprising:
   a propeller body defining a taper bore surface that, in turn, defines a taper bore cavity;
   a balancing tube arranged within the taper bore cavity and defining a balancing-tube cavity; and
   a taper bore insert configured to be received in the balancing-tube cavity and extending less than a full length of the balancing-tube cavity, wherein the taper bore insert comprises:
      a tapered outer surface, wherein the outer surface is dimensioned and configured to fit within and be of substantially a same size and shape as the balancing-tube cavity; and
      an inner surface, wherein the inner surface defines an inner cavity configured to receive a balancing medium, wherein the inner surface comprises a plurality of retention formations arranged thereon, and wherein the plurality of retention formations are configured to support the balancing medium.

2. The propeller blade of claim 1, further comprising the balancing medium arranged within the inner cavity, wherein the balancing medium comprises:
   a filler material; and
   a balancing material.

3. The propeller blade of claim 2, wherein the filler material is a binder, adhesive, elastomer, gel, sealant, or wax.

4. The propeller blade of claim 2, wherein the balancing material is at least one of metal shot, metal pellets, ceramic shot, ceramic pellets, rocks, and sand.

5. The propeller blade of claim 1, further comprising:
   a support body proximate the propeller body, wherein the support body comprises a pitch change portion configured to change a pitch of the propeller body.

6. The propeller blade of claim 1, wherein the balancing tube is formed of aluminum, titanium, an alloy of titanium, or an alloy of aluminum.

7. The propeller blade of claim 1, wherein the plurality of retention formations are a plurality of ribs formed on the inner surface.

8. The propeller blade of claim 1, wherein the plurality of retention formations are a plurality of protrusions formed on the inner surface.

9. The propeller blade of claim 1, wherein the plurality of retention formations are a plurality of grooves formed in the inner surface.

10. An aircraft propeller system, comprising:
    a propeller hub;
    a first aircraft propeller blade arranged on the propeller hub; and
    a second aircraft propeller blade arranged on the propeller hub, wherein the first aircraft propeller blade and the second aircraft propeller blade each comprise:
       a propeller body defining a taper bore surface that, in turn, defines a taper bore cavity;
       a balancing tube arranged within the taper bore cavity and defining a balancing-tube cavity; and
       a taper bore insert configured to be received in the balancing-tube cavity, and extending less than a full length of the balancing-tube cavity, wherein the taper bore insert comprises:
          a tapered outer surface, wherein the outer surface is dimensioned and configured to fit within and be of substantially a same size and shape as the balancing-tube cavity; and
          an inner surface, wherein the inner surface defines an inner cavity configured to receive a balancing medium, wherein the inner surface comprises a plurality of retention formations arranged thereon, and wherein the plurality of retention formations are configured to support the balancing medium.

11. The system of claim 10, wherein the first aircraft propeller blade and the second aircraft propeller blade further comprise the balancing medium arranged within respective inner cavities, and wherein the balancing medium comprises:
    a filler material; and
    a balancing material.

12. The system of claim 11, wherein the filler material is an adhesive, elastomer, gel, sealant, or wax, and wherein the balancing material is at least one of metal shot, metal pellets, ceramic shot, ceramic pellets, rocks and sand.

* * * * *